United States Patent [19]

Clegg

[11] Patent Number: 4,521,085
[45] Date of Patent: Jun. 4, 1985

[54] CONICAL MIDDLE COMPONENT MICROSCOPIC LENSES

[76] Inventor: John E. Clegg, 2320 Keystone Dr., Orlando, Fla. 32806

[21] Appl. No.: 631,738

[22] Filed: Jul. 17, 1984

[51] Int. Cl.$^3$ ............... G02B 13/18; G02B 21/00
[52] U.S. Cl. ............................. 350/432; 350/414
[58] Field of Search ............... 350/432–435, 350/414

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |

Primary Examiner—John K. Corbin
Assistant Examiner—Scott J. Sugarman

[57] ABSTRACT

A convex-concave conical lens and a concave-planar conical lens for insertion between the lower and middle component lenses of the *Conical Split-Image Microscopic Lens*, U.S. Pat. No. 4,277,148, dated Jul. 7, 1981, by this inventor. The two inserted lenses form the first middle component and the second middle component lenses of the new five-component stage lens and produce a 50× increase in maximum magnification (from 7× to 350×) and a 0.02 1/× reduction in concentrated beam diameter (from 0.142 1/× to 0.003 1/×).

1 Claim, 2 Drawing Figures

CONICAL MIDDLE COMPONENT MICROSCOPIC LENSES

BACKGROUND

Prior art includes the Conical Split-Image Microscopic Lens mentioned above. This stage lens has a code designation of M:RR-RR-RT:C (M—microscopic stage lens, R—refracting section of a component lens, T—transmitting section of a component lens, and C—concentrating stage lens).

The two component lenses of the disclosure have a code designation of RT-RT and when inserted between the patented component lenses change the code designation to M:RR-RT-RT-RR-RT:C.

SUMMARY

The major disadvantage of the patented Conical Split-Image Microscopic Lens is that magnification per stage is so low (7× is the maximum) that multiple stages must be used to produce high magnification. The use of multiple stages presents the problem of light penetration, which is quite poor since each stage has six component lens surfaces through which the light must pass.

The problem of light penetration is solved in two ways. First, the new five-component stage lens disclosed herein produces a magnification of 350× with only ten lens surfaces, whereas the patented three-component stage lens required three stages with eighteen surfaces to produce the same magnification. Second, the patented three-component stage lens has been incorporated into a Concentrated-Beam Illuminator for microscopes as disclosed in a copending application by this inventor. Three intensities of illumination are possible with this illuminator; low intensity of a 50 mm beam emitted by an incandescent bulb, high intensity of the beam reduced to 7 mm by one concentrator, and very high intensity of the beam reduced to 1 mm by a second concentrator.

DRAWINGS

DESCRIPTION

Figure 1:
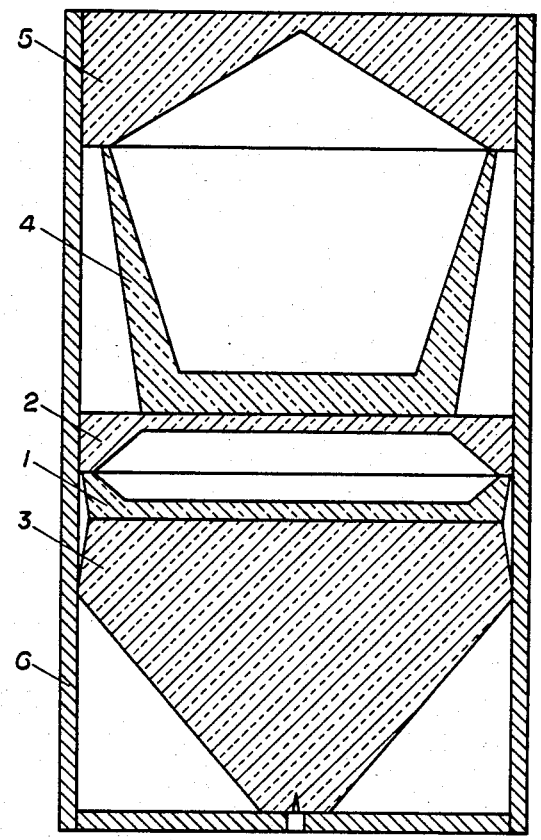
FIG. 1 is an elevation of the five-component split-image microscopic lens with the lenses shown in section.

FIG. 1 shows the first middle component lens RT 1 and second middle component lens RT 2 mounted between lower component lens RR 3 and middle component lens RR 4 of the Conical Split-Image Microscopic Lens, U.S. Pat. No. 4,277,148, July 7, 1981, by this inventor. These four component lenses are mounted with upper component lens RT 5 with axes aligned inside tubular casing 6.

Figure 2:
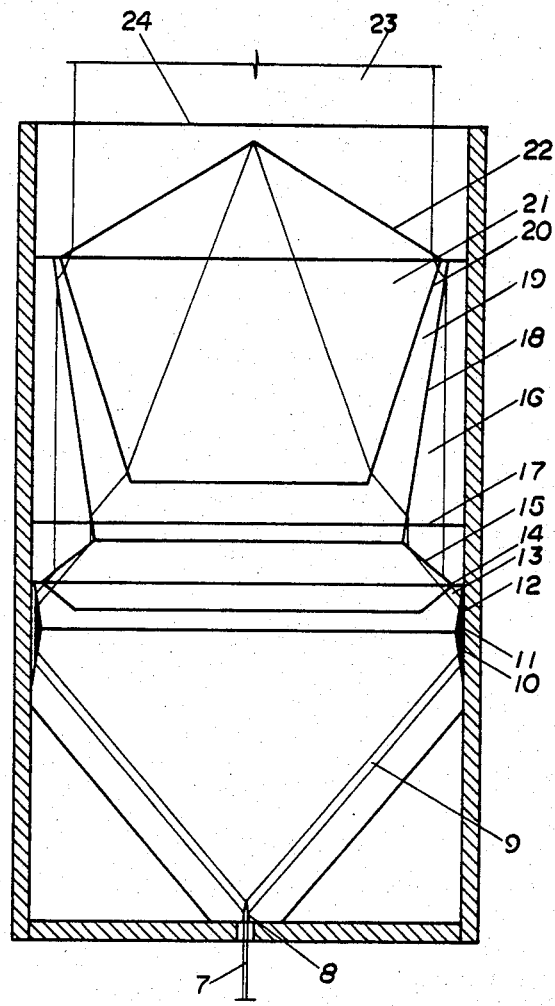
FIG. 2 is an elevation of the five-component split-image microscopic lens with ray diagram.

FIG. 2 has a ray diagram which traces the path of a beam of light through the lenses. Incipient beam 7 is refracted by concave conical section 8, forming divergent conical beam 9 which is refracted by convex conical section 10 and emitted as annular beam 11.

Annular beam 11 is refracted by convex conical section 12, forming convergent conical beam 13 which is emitted by concave conical section 14.

Convergent conical beam 13 is refracted by concave conical section 15, forming annular beam 16 which is emitted by planar section 17.

Annular beam 16 is refracted by convex conical section 18, forming convergent conical beam 19 which is refracted by concave conical section 20 and emitted as convergent conical beam 21.

Convergent conical beam 21 is refracted by concave conical section 22, forming circular whose enlarged beam 23 which is emitted by planar section 24.

The first and second middle component lenses RT 1 and RT 2 can be inserted also in the Monochromatic Beam Concentrator disclosed in a copending application by this inventor.

I claim:

1. Two conical middle component microscopic lenses RT (1, 2) for mounting between lower and middle component lenses RR (3, 4), forming a five-component microscopic stage lens mounted inside a tubular casing (6) and aligned on a common vertical optic axis so as to produce single and multiple magnification of images and single and multiple concentration of beams, with the following component lenses;
   a. Lower component lens RR (3) with a concave conical section (8) which refracts incipient beam (7), forming divergent conical beam (9), and with convex conical section (10) which refracts beam (9), forming annular beam (11),
   b. First middle component lens RT (1) with a convex conical section (12) which refracts beam (11), forming convergent conical beam (13), and with concave conical section (14) which emits beam (13),
   c. Second middle component lens RT (2) with a concave conical section (15) which refracts beam (13), forming annular beam (16), and with a planar section (17) which emits beam (16),
   d. Third middle component lens RR (4A) with a convex conical section (18) which refracts beam (16), forming convergent conical beam (19), and with concave conical section (20) which refracts beam (19), forming convergent conical beam (21),
   e. Upper component lens RT (5) with a concave conical section (22) which refracts beam (21), forming circular enlarged whole beam (23), and with planar section (24) which emits beam (23) parallel to the vertical optic axis of the lenses.

* * * * *